United States Patent

Cartwright

[15] 3,641,371

[45] Feb. 8, 1972

[54] DELAY SYSTEM FOR REGENERATING PULSE PERIODICALLY DURING DELAY INTERVAL

[72] Inventor: Victor F. Cartwright, 130 N. Janet Place, Fullerton, Calif. 92631

[22] Filed: June 12, 1970

[21] Appl. No.: 45,618

[52] U.S. Cl. ..............................307/293, 307/236, 307/260, 328/55, 328/56, 328/118, 328/223

[51] Int. Cl. ....................................H03k 17/26, H03k 17/28

[58] Field of Search ..........................307/221, 223, 293, 236; 328/55, 56, 113, 38, 223, 118

[56] References Cited

UNITED STATES PATENTS

| | | | |
|---|---|---|---|
| 3,393,327 | 7/1968 | Savage | 328/113 X |
| 2,594,336 | 4/1952 | Mohr | 307/223 |
| 2,912,576 | 11/1959 | Bacher | 328/223 X |
| 2,875,336 | 2/1959 | Williams | 328/55 X |
| 2,985,770 | 5/1961 | Kneisel | 307/223 |
| 3,226,567 | 12/1965 | Bradmiller et al. | 328/223 X |
| 3,254,233 | 5/1966 | Kobayashi et al. | 328/56 X |

*Primary Examiner*—Stanley D. Miller, Jr.
*Attorney*—Nienow & Frater

[57] ABSTRACT

A time delay system capable of delaying very fast pulses for a relatively long time without appreciable distortion by regenerating the pulse periodically during the delay interval. Each regenerated pulse is used to regenerate the next pulse. In preferred form, regeneration is accomplished in amplifiers or "switches" which are polarity sensitive. The pulse to be delayed is applied to a delay circuit which reflects it back to the input terminal with inverted polarity. The regenerating "-switch" is responsive to the reflection to initiate a new pulse.

Two delay circuits are shown. One employs a delay line and utilizes the inherent broad band characteristics of such lines to reproduce rectangular pulses after a delay. The other employs a tuned circuit in a narrow band delay system.

4 Claims, 4 Drawing Figures

INVENTOR

VICTOR F. CARTWRIGHT

BY

Nimow & Frater

ATTORNEYS

INVENTOR
VICTOR F. CARTWRIGHT
BY
Nienow & Frater
ATTORNEYS

DELAY SYSTEM FOR REGENERATING PULSE PERIODICALLY DURING DELAY INTERVAL

This invention relates to improvements in delay systems and it relates particularly to a system capable of reproducing a number of short duration pulses in succession corresponding to an initiating pulse.

The difficulty with which a series of successive pulses are provided in a delay network from a single initiating pulse increases as pulse length decreases. Phase shift and distortion attend faster pulsing so that the shape of the pulse after delay tends not to be a faithful reproduction of the original pulse. An object is to provide an improved fast pulse, time delay system in which the delayed output is a faithful reproduction of the input signal.

One application for delay systems of the kind provided by the invention is in radar systems in which echoes are applied to a number of gates which are opened at different times by the application of gating pulses. In such a system the echo will pass through a particular one of the gated depending upon the distance to the target from which the echo was returned. A particular object of the invention is to provide a delay system suitable for use in that radar application. On the other hand, the invention is capable of producing a faithful reproduction of an initiating signal after a very substantial time delay for any application and even if only a single delayed pulse is required. Thus, a more general object of the invention is to provide a system capable of faithfully reproducing a very short input pulse after a substantial time delay.

In the invention an initiating pulse is reproduced after a delay sufficiently short so that distortion is low. The delayed pulse is applied to an active network capable of reproducing the initial pulse despite some envelope distortion or step function rise time degradation.

In the preferred embodiment, the pulse regeneration units provide a constant output voltage for the period of the pulse even if load impedance varies and without affecting the delay time. This result is achieved by using switches such, for example, as semiconductor current amplifiers which are operated near zero bias and are driven to saturation current flow by an input pulse for the duration of the pulse. In the embodiment selected for illustration in the drawings, the pulse is regenerated in successive cathode followers which are zero biased and are connected in parallel with a delay circuit. The input pulse to the delay circuit has polarity opposite to that required to "trigger" or "fire" the follower to the "current on" condition. However, the delay circuit is terminated so that the input wave is "reflected" with opposite polarity. The front of the reflected pulse has the polarity required to turn on the cathode follower. In an alternative form of the invention the delay line and switch are connected in series and the switch is responsive to the input pulse without phase reversal. It is turned on, or off, when the pulse traverses the delay circuit.

Figure 1:
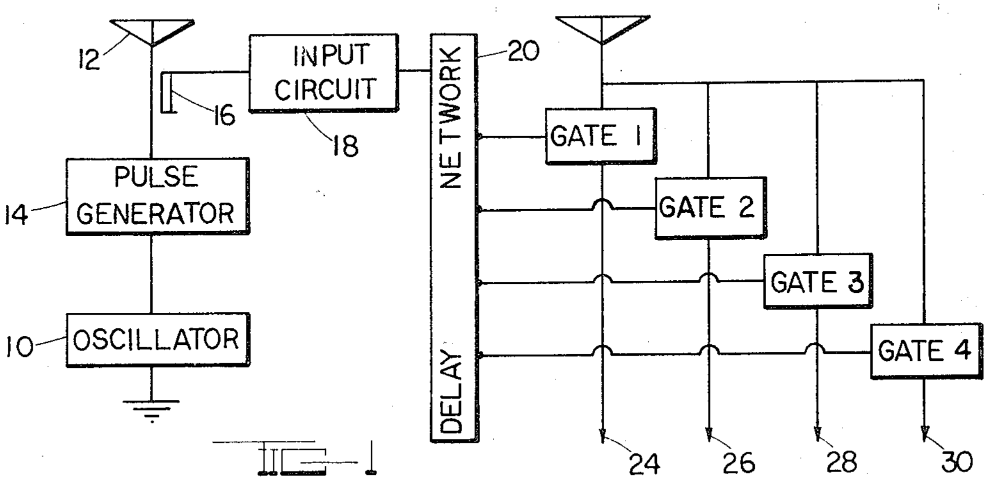
FIG. 1 is a schematic diagram of a radar system which incorporates a delay system embodying the invention.

In the circuit of FIG. 1, very high frequency radio signals are generated in the oscillator 10. Energy from the oscillator is applied to the transmitting antenna 12 in very short bursts or pulses as a result of the action of the pulse generator 14. For example, the pulse generator may permit 1,700 MHz. power from oscillator 10 to reach the antenna 12 for a period of only 10 nanoseconds at a pulse repetition rate of 1 MHz. Some of that energy is extracted from the transmitter output circuit by coupling device 16 is applied to an input circuit 18 where it is rectified and reduced substantially to a pulse of 10 nanoseconds duration. That input circuit 18 and the delay network 20 comprise a delay system which, in this example, provides four output signals. Each of those output signals is required to be a pulse with a length equal to that of the initiating pulse. The several output pulses are applied in succession to gate 1, gate 2, gate 3 and gate 4. These four gates are opened during the period that a pulse is supplied to them from the delay network. If energy from transmitting antenna 12 is reflected from a distant target back to the receiving antenna 22, that signal will be applied to the input circuit of each of the four gates. If the input signal is applied to any gate simultaneously with the application to that gate of a delayed gating pulse, then the echo signal will pass through the gate to one of the output circuits labeled 24, 26, 28 and 30. Thus, whether the echo will pass through one gate or another depends upon how much time elapses following transmission of the pulse by antenna 12 before the echo is received. Since elapsed time is a measure of distance to the reflection point, the appearance of an output signal at an output terminal is indicative of the distance from which the echo was returned. Accordingly, each output terminal corresponds to a different radar range.

Figure 2:
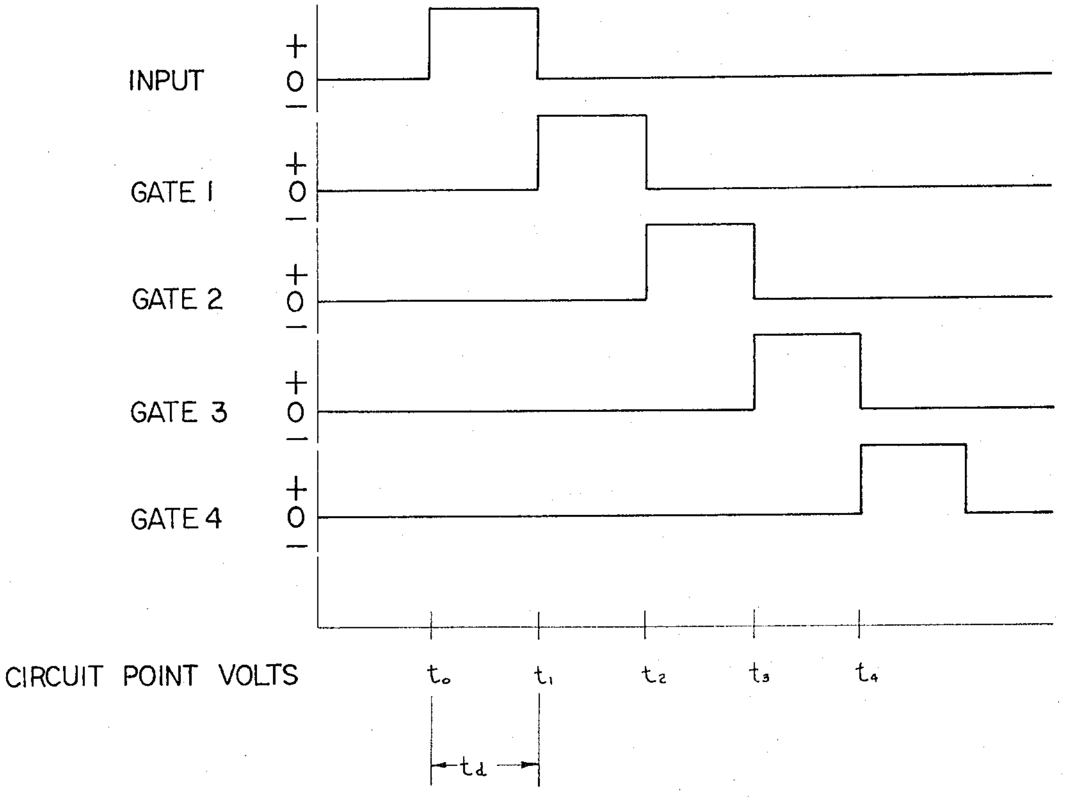
FIG. 2 is a series of graphs illustrating the function of the time delay system of FIG. 1 in terms of the voltages produced at the various points in the radar system of FIG. 1.

To insure best accuracy of results in such a radar system it is essential that the gating pulse applied to each of the gates be substantially a square wave. To provide a square wave of such short duration has proven to be very difficult in the past when an appreciable time delay was required to be achieved. That the desired result can be achieved in the invention is illustrated in FIG. 2. In that Figure, five voltage scales are plotted against a common time scale. The top voltage scale shows the input pulse delivered by input circuit 18 to the delay network 20. The pulse begins at time $t_o$. The other voltage scales indicate the output voltages of the delay network 20 that are applied to gates 1, 2, 3 and 4 at times $t1$, $t2$, $t3$ and $t4$ respectively.

In a typical missdistance radar indicator used to determine the distance at which bullets and other projectiles pass the target, it might be required to measure missdistances up to 100 feet with an accuracy of plus or minus 5 feet. Such a system would require 10 gates and a delay in application of the gating signal to the last of those gates of 200 nanoseconds. A 10-nanosecond square wave would experience severe waveform distortion if delayed that long in a conventional delay line. The invention can insure application of a square wave to all of the gates including the last one.

Figures 3, 4:
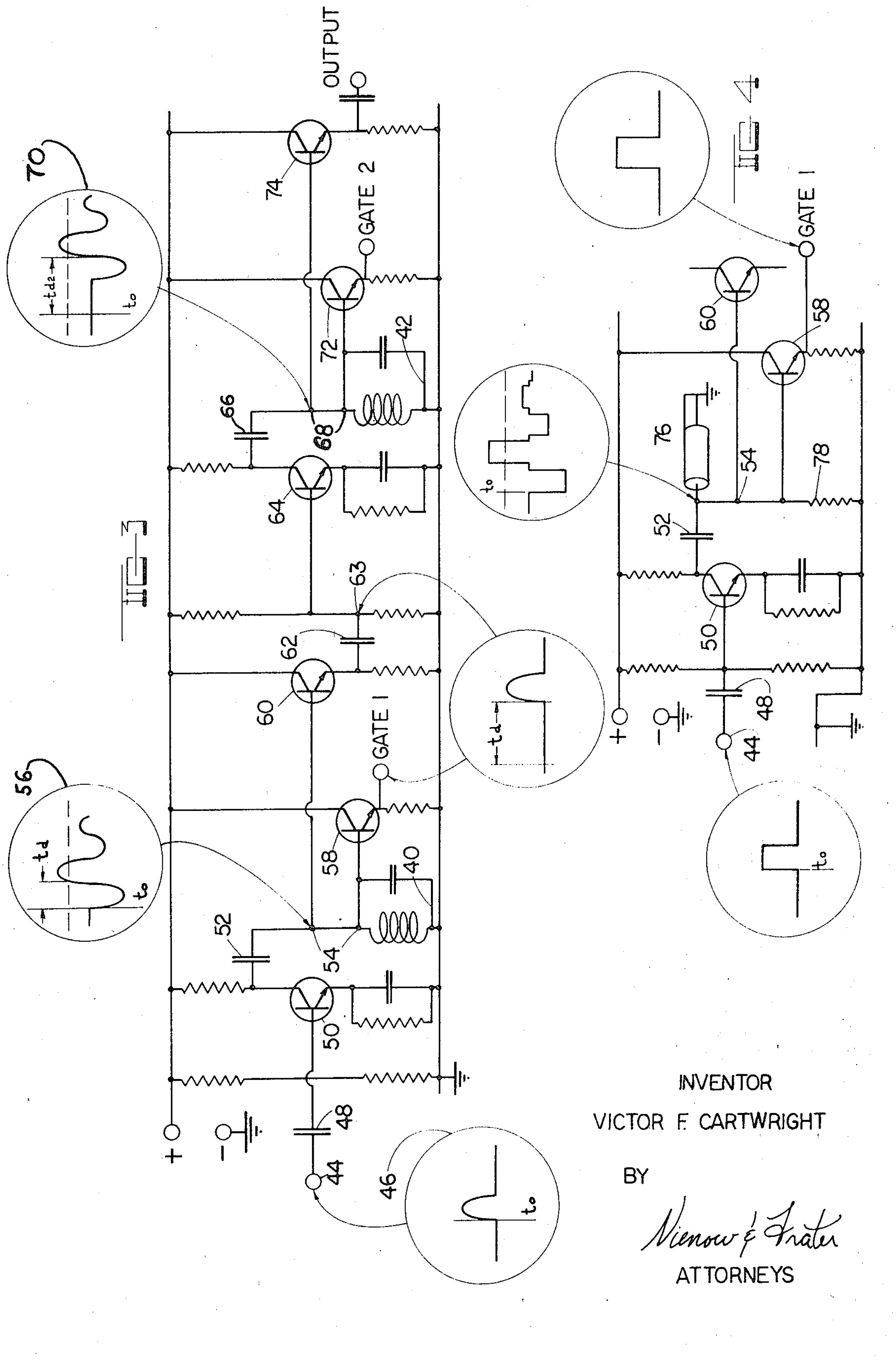
FIG. 3 is a schematic diagram showing, in greater detail, a portion of the delay system of FIG. 1, together with graphs of the voltage waveshapes at certain circuit points.
FIG. 4 is a portion of the schematic diagram of FIG. 3 showing an alternative form of delay element.

In a broad sense, any apparatus or device that will accept an input signal and from which that signal can be derived at a later time is suitable for use in the invention as the delay means. It is preferred that the delay apparatus or device be one from which it is possible to take an output signal which is the inverse in terms of polarity of the input signal. An example of an adequate structure is a delay line which will reflect a signal back to the input terminal where it will appear with reversed polarity. Another example is a tuned L–C circuit. In FIG. 3 the delay devices 40 and 42 are tuned L–C circuits. They will provide a 10-nanosecond delay if tuned to 50 MHz. The use of such a delay permits the output of one delay circuit to be connected to the parallel combination of another delay circuit and an active circuit which will reproduce the pulse applied to it in response not to the initial pulse but only to the reflected pulse whose polarity has been reversed.

FIG. 3 is a circuit diagram of several stages in the delay network 20. The input signal to the input terminal 44 in FIG. 3 is the output of the input circuit 18 of FIG. 1. It is assumed, as illustrated at graph 46 in FIG. 3, that the input signal is a positive pulse rising at time $t_o$ and that pulse duration is 2 nanoseconds. The input signal is applied to a coupling capacitor 48 to the base of an NPN-transistor connected in the common base configuration. Transistor 50 operates as an amplifier and its output is taken at the collector and applied through a coupling capacitor 52 to a circuit point 54. The voltage variation at that point is illustrated in the graph 56 where the symbol $t_d$ represents the delay time in the delay circuit 40. There is a phase reversal in the transistor 50 circuit that accounts for the initial negative-going pulse at point 54 beginning at time $t_o$. That pulse produces an oscillatory current in the parallel L–C circuit 40 and the reflected signal appears as a positive pulse at point 54 after one half cycle.

Two emitter-follower circuits are connected in parallel to point 54. One has its output connected to an output gate and the other forms part of another delay unit in which its function is to provide a square pulse and current gain. Each of these circuits employs an NPN-transistor having its base connected to the point 54. Both of them provide an output signal in response only to a positive input signal. They respond to a positive pulse to generate an output pulse of like duration and polarity. The output of transistor 58 is applied to gate 1 and the pulse that appears at the output terminal corresponds to the signal illustrated in FIG. 2 at gate 1. The other transistor 60 has its output connected through a coupling capacitor 62 to an NPN-transistor 64. Transistor 64 is part of an amplifier connected in the common base configuration. The output of that amplifier is connected through a coupling capacitor 66 to a circuit point 68. Signals passing through transistor 64 are reversed in phase as illustrated in the diagram 70 where the negative-going pulse results from the application to transistor 64 of the positive-going pulse. That pulse was initiated in transistor 60 in response to the reflected positive pulse at circuit point 54. That negative pulse is applied also to the input of delay circuit 42. The pulse oscillates in parallel tuned circuit 42 and appears with reversed polarity at point 54 one half cycle later. This is illustrated in the graph 70.

As in the case of the first stage, two emitter-follower circuits are connected in parallel to circuit point 68. One of them employs a transistor 72 and has its output connected to gate 2. In response to application of the positive reflected pulse to circuit point 68, transistor 72 regenerates that pulse at the output terminal marked gate 2. The other transistor 74 also regenerates the reflected positive pulse at its output terminal for application to successive stages.

The emitter-followers are all zero biased and are "fired" or "turned on" only by a pulse of one polarity. Since NPN-transistors are employed, they are turned on only by positive pulses in the circuit shown. Each emitter-follower is driven to saturation by a large input signal so that its output is a square wave. Current amplifiers in preceding stages provide the large signals. Those current amplifiers are emitter-follower stages. Once it is rendered conductive the emitter-follower input impedance drops enough to damp further oscillation in the tuned delay circuit.

One of the advantages of using polarity sensitive pulse regenerating stages is that they can be made responsive only to reflected signals so that a tuned circuit can be used for ease in delay time adjustment or so that a shorter delay line can be utilized to accomplish a selected delay. On the other hand, it will be apparent that the system will be operative and a new pulse will be generated after each successive time delay if the pulse regenerator is made responsive to the delayed signal that appears at the output end of the time delay device rather than the reflection of that signal back to the input. For example, the emitter-follower stage which incorporates transistor 60 could be remade to respond to negative pulses and its base could be connected in series with a delay line. A number of other variations are possible by utilizing additional phase reversal stages or by the employment of PNP-transistors.

The several emitter-follower stages serve as switches in the sense that they are made responsive to the rise and fall of an incoming pulse to accomplish a switching action. By that action a pulse is produced which is not a reproduction of the incoming pulse shape as would be produced by an amplifier. Instead the pulse output of the emitter-follower depends upon the impedance characteristics of its circuit. Each emitter-follower can be made to produce pulses having the same shape as those produced by the others to insure that the last pulse is the same as the first; however, many steps are employed in the delay.

FIG. 4 illustrates how a delay line can be utilized instead of the tuned delay circuit. Only the first stages of the FIG. 3 circuit are shown in FIG. 4 but the substitution can be made in all delay sections. A short circuited length of coaxial transmission line 76 serves as the delay line. It is connected in parallel with a loading resistor 78.

It is possible by utilizing the output of the time delay circuit as the input to the following stages to initiate successive pulses prior to termination of the succeeding pulse. For example, in FIG. 4 is the base of transistor 60 were connected to the output end of delay device 76 through a phase reversal circuit it would be possible by appropriate selection of a time delay to initiate an output pulse at gate 2 prior to termination of pulse at gate 1.

In the examples selected for illustration in FIGS. 3 and 4 the emitter-followers 58 and 72 are operated in much the same way as are emitter-follower stages 60 and 74. The result is that the output signal at each gate has the same shape as does the signal that is passed on to the next stage in the delay system. This feature is not essential. While it is necessary to pass on to each succeeding stage of the delay system a faithful reproduction of what is required at the last stage, it may not be essential to read out such a faithful reproduction at each stage.

Although I have shown and described certain specific embodiments of my invention, I am fully aware that many modifications thereof are possible. My invention, therefore, is not to be restricted except insofar as is necessitated by the prior art.

I claim:

1. In a delay system:

a first and a second delay means including a parallel L–C circuit each for providing an output pulse of given polarity in response to a previously applied pulse of opposite polarity; and application means for applying an input signal to the second delay means as an incident to provision of an output signal by the first delay means;

said first and second delay means each comprising an emitter-follower and a phase reversing amplifier in that order and which further comprises an emitter-follower in parallel with the emitter-follower of each delay means.

2. In a pulse delay system, in combination:

first and second delay circuit means for receiving input pulses of one polarity and, after a time delay, issuing output pulses of opposite polarity, first and second switch means connected in parallel with said first and second delay circuit means, respectively, for providing a delayed pulse in response to said output pulses, and means for receiving the output pulse issued from said first delay circuit means and inverting it and applying the inverted pulse to the second delay circuit means and to the second switch means.

3. The invention defined in claim 2 in which said first and second switches comprise cathode followers.

4. The invention defined in claim 2 which further comprises a pair of gates and third and fourth switch means each connected between an associated one of said delay means and an associated one of said gates for furnishing a signal to the gate in response to the output pulse of the delay means.

* * * * *